United States Patent [19]

Ueda

[11] 4,375,586
[45] Mar. 1, 1983

[54] COOKING ASSISTANCE DEVICE AND A COMBINATION THEREOF WITH A MICROWAVE OVEN

[75] Inventor: Shigeki Ueda, Nara, Japan

[73] Assignee: Matsushita Electric Industrial Company, Limited, Osaka, Japan

[21] Appl. No.: 159,197

[22] Filed: Jun. 13, 1980

[30] Foreign Application Priority Data

Jun. 15, 1979 [JP] Japan .................................. 54/76129

[51] Int. Cl.³ ............................................. H05B 6/68
[52] U.S. Cl. ...................... 219/10.55 B; 219/10.55 E; 219/10.55 R
[58] Field of Search .................. 219/10.55 B, 10.55 R, 219/10.55 M, 10.55 E; 364/710, 705

[56] References Cited

U.S. PATENT DOCUMENTS 3,569,656 3/1971 White et al. ................... 219/10.55 B
4,158,432 6/1979 Van Beuel ..................... 219/10.55 B
4,164,789 8/1979 Toyomura et al. ................. 364/710

OTHER PUBLICATIONS

Toshiba ER-899 BT-1, "The Brainwave", 5-1977.

Primary Examiner—Bruce A. Reynolds
Assistant Examiner—Philip H. Leung
Attorney, Agent, or Firm—Lowe, King, Price & Becker

[57] ABSTRACT

A cooking assistance device for use with a microwave oven comprising a card reader for reading a menu data recorded in a card, a memory unit in which data representing the quantity of foodstuff materials to be heated by said oven and heating processes are stored, and a control unit for reading data from said memory unit in response to the menu data. A character code generator provides conversion of the data read from said memory unit into a character code which is fed into a miniprinter mounted in said oven to provide a print out of characters on a recording medium. A data input key is also provided for entry or alteration of data representing the quantity of servings. A power controller determines the power level and heating interval of the foodstuff based on the stored and keyboard input data and accordingly controls the heating operation.

6 Claims, 10 Drawing Figures

COOKING ASSISTANCE DEVICE AND A COMBINATION THEREOF WITH A MICROWAVE OVEN

BACKGROUND OF THE INVENTION

The present invention relates to a computer-based cooking assistance device, and more particularly to a combination thereof with a microwave oven. The cooking assistance device is capable of editing stored items of culinary information in response to input data and provides output data which includes a list of materials to be prepared and instructions to be observed by the user during cooking.

The recent introduction of microcomputers into household appliances has increased their functions and capabilities to a remarkable degree. There have been introduced computer-controlled microwave ovens having features which include programmable sequence heating and automatic level adjustment using a sensor. These additional features, on the other hand, have added complexity to the cooking procedure which, in the extreme, would represent annoyance to the user. Therefore, simplicity of operational procedure is strongly desired by the user. This demand is partly met by recent introduction of card reader mounted microwave ovens which automatically read off data stored in magnetic cards prepared by the manufacturer and provide heating according to the programmed sequence or instructions represented by the input data. More specifically, each magnetic card is prepared for each item of cooking menu with a set of time and heating level data recorded therein. The input data is processed by the built-in microcomputer, so that the user does not have to worry about the cooking process.

However, prior to cooking operations, the use has to consult a reference book to prepare foodstuff according to the directions given in that book. In addition, the fact that most of the energy radiated from the magnetron of microwave oven is absorbed by the foodstuff being heated is a great advantage, on the one hand, from the energy savings standpoint, but, on the other hand, a disadvantage on the part of the user from the operational standpoint since it requires a precision adjustment of the microwave energy according to the quantity of the foodstuff.

SUMMARY OF THE INVENTION

The present invention has for its object the provision of a cooking assistance device which assists the user or cook to prepare items of foodstuff and provides the process of cooling according to a desired item of dishes.

Another object of the invention is to provide a cooling assistance device which makes available information on the quantity of materials to be prepared according to the input menu data and the number of servings in the form of a list printed on a recording paper and provides power control of a microwave oven according to the quantity and number of servings data, whereby the user is freed from making adjustment of the power level and heating time of the microwave oven.

A further object of the invention is permit a display unit and a printer to be operated on a time sharing basis to provide visual indication of quantity data simultaneously with the printing operation.

A still further object of the invention is to permit the power level of a microwave oven to be controlled in accordance with a data representing the number of servings and menu item which was keyed into the apparatus when the cooking item is being prepared.

BRIEF DESCRIPTION OF THE DRAWINGS

The invention will be further described with reference to the accompanying drawings, in which.

DETAILED DESCRIPTION

Figure 1:
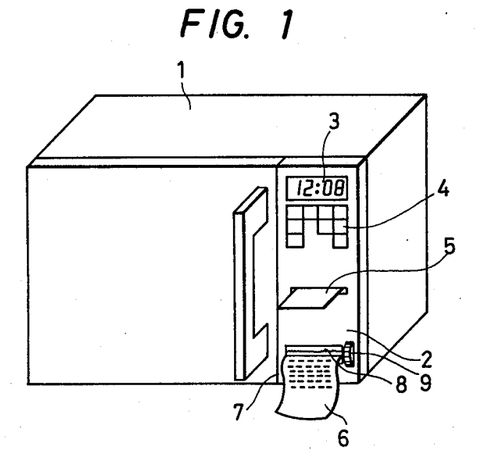
FIG. 1 is a perspective view of a microwave oven having a built-in cooling assistance device constructed according to the present invention.

FIG. 1 is an illustration of a perspective view of an embodiment of the present invention. On the front panel 2 of a microwave oven 1 are mounted a display 3 for visual indication of heating time periods and other data, a keyboard 4 for manual data entry, a menu data entry section 5 including a card reader, and a mini-printer 7 for recording output data on a recording paper 6. The printer may be of electrosensitive or thermally sensitive type. Numeral 8 is a paper cutter and 9 is a paper feeder. The menu data entry section 5 may also be of a keyboard construction by which coded menu data may be entered into a microcomputer which will be described later.

Figure 2:
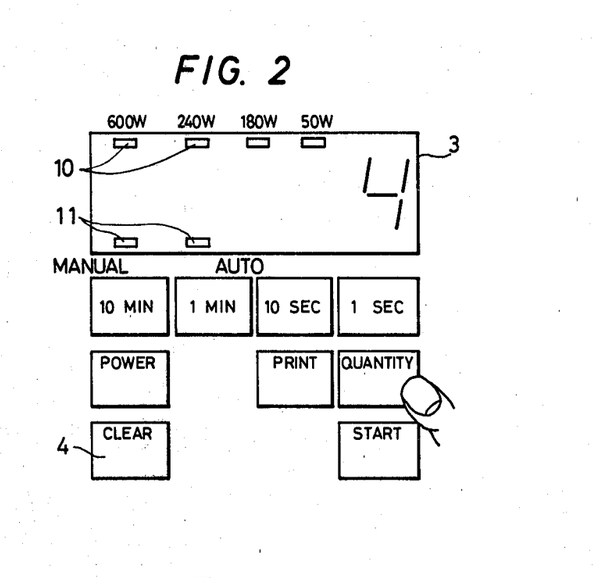
FIG. 2 is an illustration of the arrangement of operating keys.

FIG. 2 shows the detail of the manual input keyboard 4. The four keys designated "10 Min", "1 Min", "10 Sec" and "1 Sec" are arranged on the top row of the array and are connected to the visual display 3 to provide a four digit representation of heating periods by tapping each key a necessary number of times or depressing it for a period until a desired data is displayed These keys may also be comprised of ten keys designated "0" to "9" in the conventional manner. The key designated "POWER" is used manually to switch on the microwave oven 1, the operation of which lights up a power status lamp 10. Numeral 11 is a mode status lamp indicating whether the cooling operation is manual or automatic. The latter mode is effected by inserting a card into the card reader 5.

The quantity key "QUANTITY" is used for the entry of a data representing the quantity of foodstuff necessary for the entered menu. By tapping the key "QUANTITY" four times, a data indicating the amount of foodstuff to be served for four persons can be entered. It is also possible to enter a different scale of data by assigning each tapping operation an amount corresponding to a one-half serving, for example. Thus, five tappings on the "QUANTITY" key provide entry of 2.5 servings which are displayed on the unit 3. Alternatively, the contents of the "QUANTITY" key may be set up in advance and stored in a memory and the stored contents are altered as required whenever the quantity data is made available for processing.

The "PRINT" key is used for entry of operation instruction associated with the mini-printer, the instruction data being made available as needed upon the completion of quantity data entry. The "CLEAR" key is an instruction key for erasing the data previously stored in memory and the start key "START" is used to start operation of the microwave oven.

Figure 3:
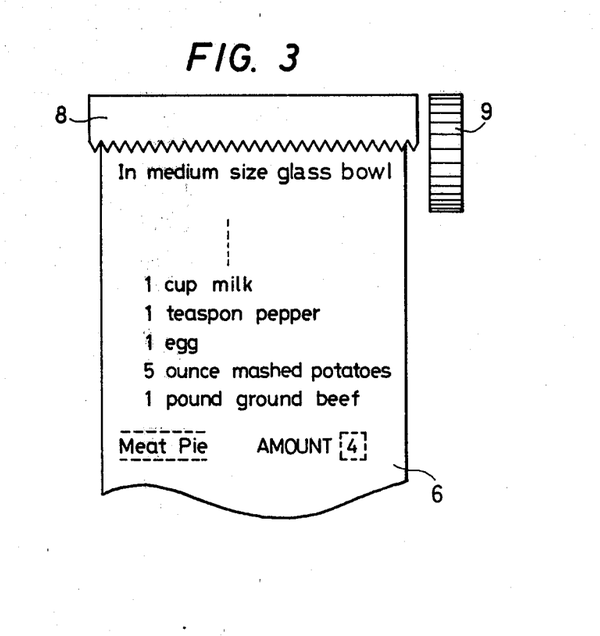
FIGS. 3 and 4 are illustrations of printed data.

With the above key arrangement, a desired item of dishes is entered by means of the menu entry section 5 followed by the operation of the "QUANTITY" key and then followed by the operation of the "PRINT" key. The mini-printer 7 starts operating and provides a print-out as illustrated in FIG. 3. More specifically, the print-out data indicates the amount of the necessary items of food materials, the instructions to be observed by the user when the materials are being cooked, and the amount of cooking or heating time. Appropriate information is given by the instructions which have been derived from the entered quantity data. The instructions may include, for example, information as to the necessity of agitation of boiled foodstuff according to the entered quantity data.

Figure 4:
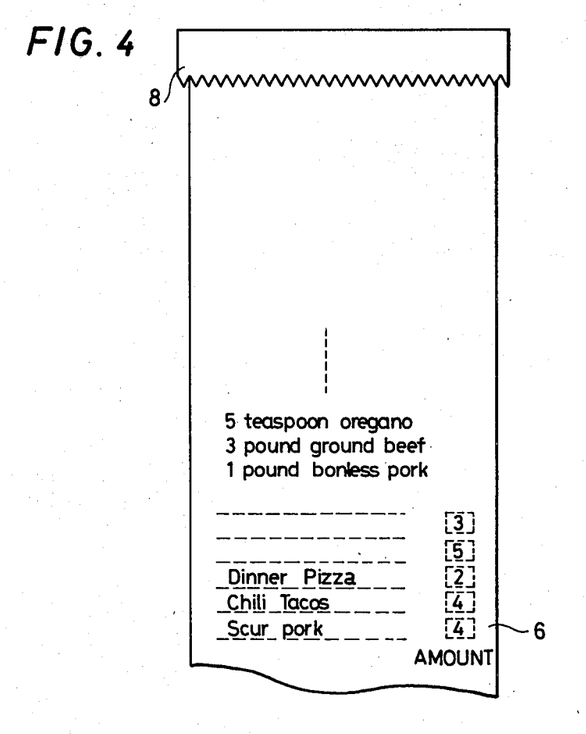

It is also possible that the system is made to store a plurality of desired cooking items in memory by allowing the user to successively enter the associated data, or make available a print out data indicating items assorted according to the materials. For example, a one-week list of cooking items can be printed out, as shown in FIG. 4. The print paper can, of course, serve as a shopping list.

Figure 5:
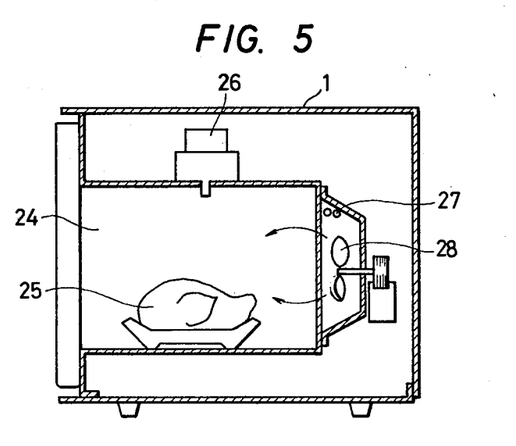
FIG. 5 is a cross-sectional view of the microwave oven of FIG. 1.

FIG. 5 is an illustration of a cross-sectional view of the microwave oven 1 which comprises a heating chamber 24 in which a foodstuff 25 is placed, a magnetron 26 which radiates microwave radiation to the article being heated, a heater 27 and a fan 28 which supplies heated air to the article for additional surface heating.

Figure 6:
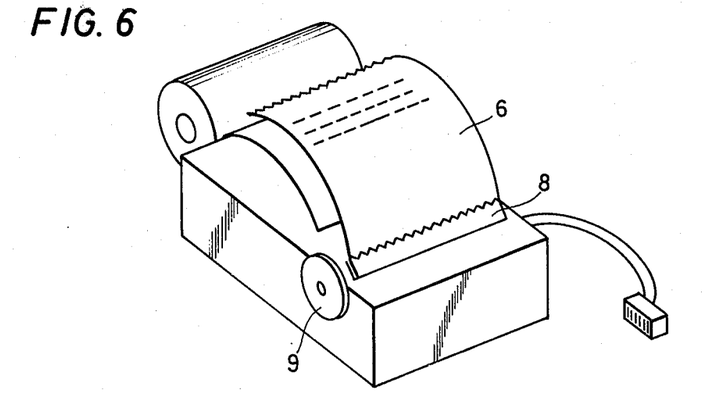
FIG. 6 is a perspective view of the printer of FIG. 1.

FIG. 6 is a perspective view of the mini-printer employed in the invention using electrosensitive or thermosensitive printer heads.

Figure 7:
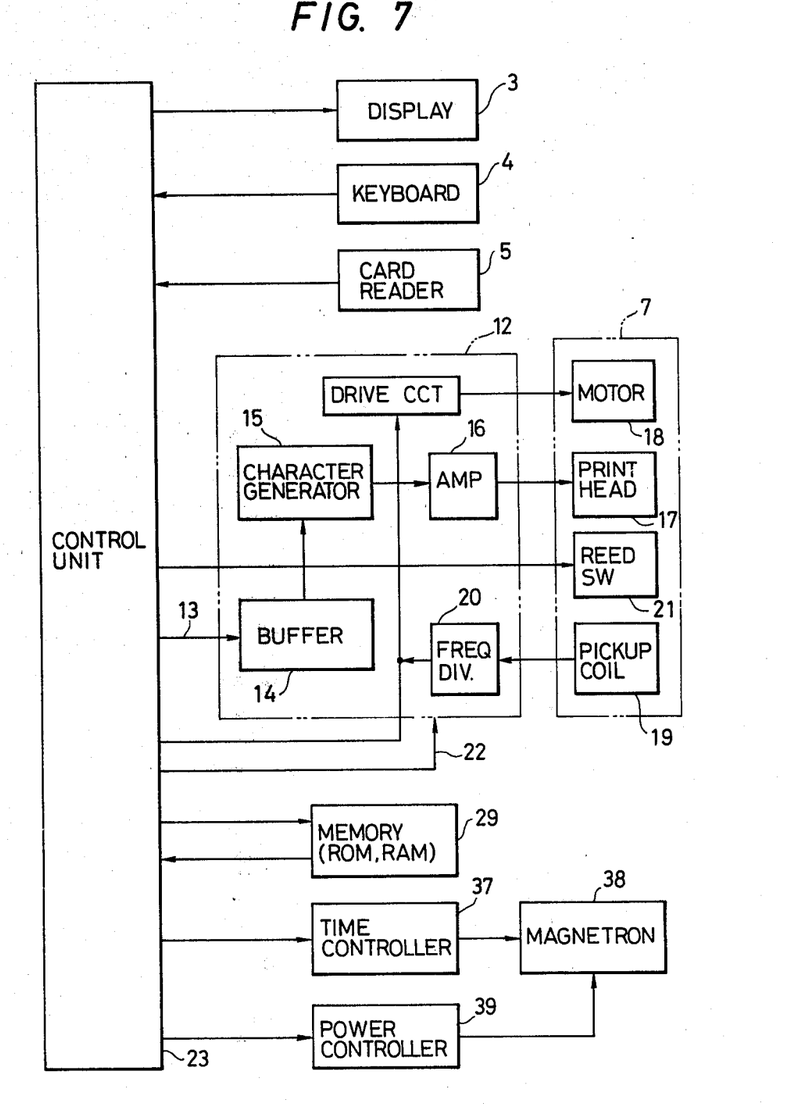
FIG. 7 is an illustration of a schematic diagram of the cooking assistance device of the invention.

FIG. 7 is an illustration of a block diagram of the control section of the system of the invention. The operational instructions entered in response to the operation of the keyboard 4 or menu entry data section 5 (inserting a card into a reader built in the section 5) are decoded by a main control unit 23, the decoded data being processed and displayed on the display 3. The control unit 23 reads heating data from the memory 29 (the heating data being stored in the ROM in advance) and sends a print-out control signal and output data to a printing control unit 12 in response to the operation of the "PRINT" key. The printing control unit 12 then causes the printer 7 to operate to provide a record of cooking data on the printing paper.

The print data on a line 13 are fed into a buffer memory 14 in binary coded form and converted into a character code in a character generator 15. A printer head drive amplifier 16 and a printer head 17 are energized by the character code to print it out on the recording paper. The motor 18 causes the printing head 17 to move reciprocally during the time when a line is being printed and causes the paper to move by the width of a line to the next upon the completion of a line print out. A pickup coil 19 generates an impulse in response to the rotation of the motor 18 and supplies it to the print control unit 12 as a timing signal. Numeral 20 is a frequency divider for dividing the frequency of the timing signal to provide adjustment of the pulse width. Numeral 21 is a reed switch which detects the position of the printing head 17 for generating a command signal for initiating a line shift or line print-out. The print control unit 12 receives a print command signal via a line 22 from the main control section 23 to initiate printing operations. The control unit 23 operates on the keyed-in quantity data to provide conversion of the basic or standard heating time data stored in the memory 29 to generate a modified heating time data and supplies it to a time controller 37. In response to this modified time data the time controller 37 controls the operating time of the magnetron 38 of the microwave oven 1. The amount of power delivered from the magnetron to the foodstuff 25 placed in the oven chamber 24 is also controlled by a power controller 39 in response to a power control signal supplied from the control unit 23. This control signal is also generated on the basis of the keyed input of the quantity data.

Figure 8:
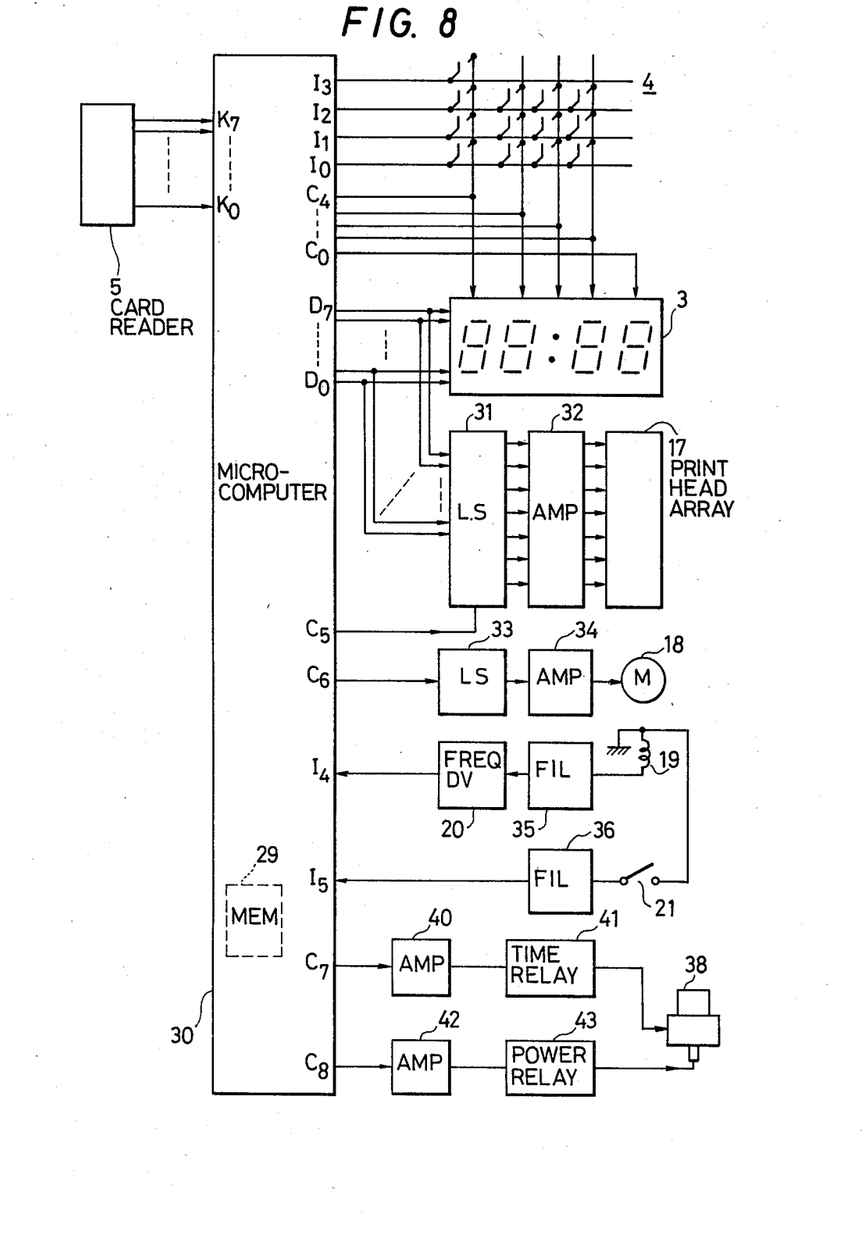
FIG. 8 is an illustration of the detail of the block diagram of FIG. 7.

FIG. 8 is an illustration of the detail of the block diagram of FIG. 7. The control unit 23 is a microcomputer 30 which includes the memory 29 constructed on a single IC chip with the central processing unit. The display unit 3 is energized dynamically by an 8-bit word supplied over data ports $D_0$ to $D_7$ and scan control ports $C_0$ to $C_4$. The keyboard 4 is scanned by signals over the scan control ports and provides a 4-bit word to input ports $I_0$ to $I_3$. The card reader 5 feeds a menu code word and heating data word to input ports $K_0$ to $K_7$. Data ports $D_0$ to $D_7$ are used to deliver print data to the display unit 3 as well as to a print head level shifter 31 upon receipt of a command signal on a control port $C_5$. The level shifter 31 provides conversion of the print data into a head control code which drives the seven-element print head 17 via power amplifiers 32. In the present embodiment, the buffer memory 14 and the character code generator 15 are included in the microcomputer 30 which is programmed in a manner as will be described below. The motor 18 is under the control of a control port $C_6$ through a motor level shifter 33 and a motor drive power amplifier 34. The pickup coil 19 has its output connected to a filter amplifier 35 for waveshaping purposes and thence to the frequency divider 20 with which the pulse width is controlled. The reed switch 21 is connected to a filter 36 which shapes the output of the reed switch 21 and supplies its output to an input port $I_5$ of the microcomputer 30. The latter controls the motor 18 in accordance with the signals from the picup coil 19 and the reed switch 21. The magnetron 38 is controlled by means of a time relay 41 which is energized by an amplifier 40 in response to a time control signal $C_7$ supplied from the computer 30. The power level of the magnetron 38 is ON-OFF controlled by means of a power relay 43 through amplifier 42 in response to a power control signal $C_8$ from the computer.

Figure 9A:
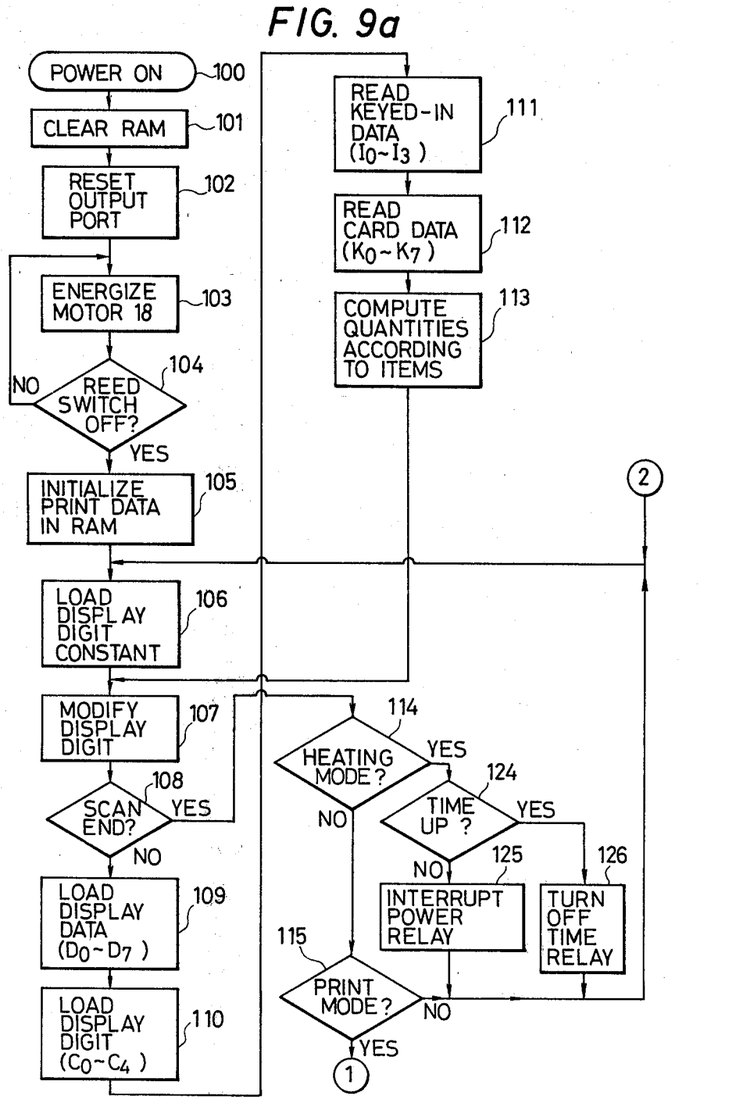
FIGS. 9a and 9b are illustrations of flowcharts describing the programmed sequence of operations executed by the microcomputer of FIG. 8.
Figure 9B:
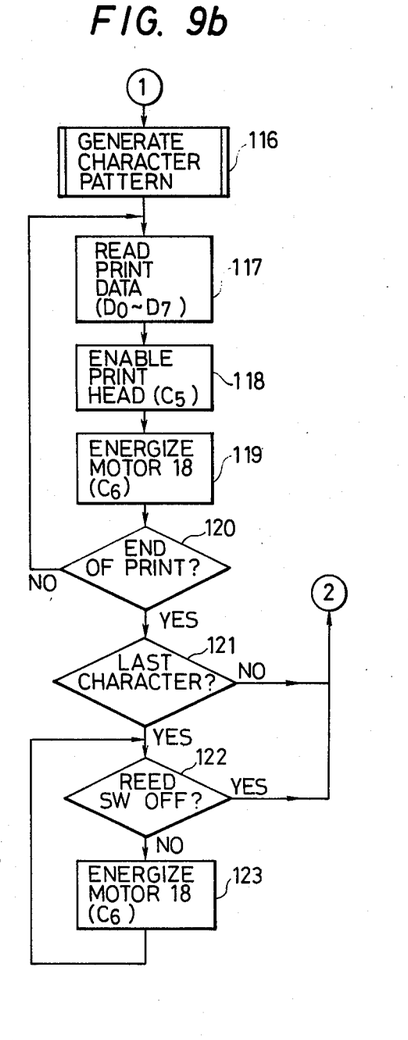

A more detailed description of the sequence of the programmed steps of the microcomputer 30 will now be described with reference to flowcharts shown in FIGS. 9a and 9b.

In step 100 power is switched on and subsequently in step 101 the random access memory (RAM) is cleared. The output ports of the microcomputer are reset to zero in step 102. In step 103 the motor 18 is momentarily energized to provide a predetermined amount of rotation. The computer then checks to see if the reed switch is turned off and if not turned off, it returns to the step 103 to repeat the steps 103 and 104 until the reed switch is turned on for the purpose of adjusting the position of the printer head to the starting point. When the the printer head is in the starting position, the reed switch is turned on and the print data in the RAM is initialized in step 105. In step 106 a display digit is loaded into the RAM for the purpose of controlling the display unit 3 in the dynamic mode. In step 107 the display digit is modified and in step 108 the computer checks for the end of scanning operation for the display unit 3. If the scanning is not ended, a display data ($D_0$-$D_7$) is loaded into the RAM in step 109 and then in step 110 the display digit data $C_0$-$C_4$ is loaded into the RAM. In step 111, the quantity data $I_0$-$I_3$ representing the number of servings, which has been set in the keyboard, is read off by the central processing unit which then enters the menu data $K_0$-$K_7$ from the card reader 5. The computer then proceeds to step 113 to execute on the data $I_0$-$I_3$ and $K_0$-$K_7$ to find the quantity of each material of the desired menu item. The microprocessor now returns to the step 107 in order to repeat the previous steps until the scanning operation is complete.

Upon the completion of the scanning operation, the computer goes to step 114 to check to see if the microwave oven is in the heating mode or not; if not, it goes to step 115 to check to see if the printer is in the print mode or not. If the printer is not in the print mode the microprocessor goes to the step 106 and if the printer is in the print mode it goes to step 116 to generate a character pattern and then proceeds to step 117 to read off the print data $D_0$-$D_7$ and transmits it to a row of printer head elements. In step 118 the printer head is enabled to effect printing of the generated character and in step 119 the motor 18 is momentarily energized to sift the printer head to the next position. In step 120, if the printing operation is in progress, the computer proceeds to step 117 to repeat the above process until the printing operation is complete. Upon the completion of printing of a given character, the computer proceeds to step 121. If the printing operation is not complete with respect to other characters the computer proceeds to step 106, and if all the characters have been printed, the computer proceeds to step 122 to check the operating state of the reed switch 21. If this switch is turned off the computer proceeds to step 106 and if it remains in the ON state the motor 18 is energized momentarily in step 123 and repeats the steps 122 and 123 until the printer head returns to the starting position.

Therefore, it is appreciated that the display unit and the printer are operated on a time sharing basis.

If the microwave oven is in the heating mode, the microprocessor proceeds to step 124 from step 114 to check to see if the heating time period is over. This heating interval is determined by the data stored in the RAM based on the number of servings and the menu item. If the heating operation is still in progress, step 125 is executed to interrupt the power relay 43 for a duration determined on the basis of the stored data representing the number of servings and menu item for the purpose of controlling the power level of the magnetron 38. The microprocessor then returns to the step 106 to repeate the operations stated in the steps 114, 124 and 125 until the heating time period is over. At the end of the heating interval, step 126 is executed to turn off the time relay 41 to de-energize the magnetron. The microprocessor now returns to the step 106 again to execute the instructions stated in the steps 106 and 107.

What is claimed is:

1. A cooking apparatus comprising:
    a microwave oven having a source of microwave energy;
    a memory for storing standard menu data representing a list of materials and quantity of each of said materials for a predetermined number of servings and standard heating pattern data representing a power level and an operating time of said microwave energy source for said predetermined number of servings;
    a data entry unit for manually entering into said memory quantity data representing a desired number of servings to be prepared;
    a printer;
    a power control unit for controlling the power level and operating time of said microwave energy source in response to stored and manually entered data applied thereto; and
    a data processing unit including:
    means responsive to said manually entered quantity data for converting said standard menu data into actual menu data representing a list of materials and quantity of each of said materials for said desired number of servings and converting said standard heating pattern data into actual heating pattern data representing a power level and an operating time of said microwave energy source for said desired number of servings;
    means for converting said actual menu data into corresponding print data and applying the print data to said printer to provide a printout of said list of materials and quantity of each said material for said desired number of servings according to which a user prepares food;
    means for writing said actual heating pattern data into said memory; and
    means for reading said actual heating pattern data out of said memory into said power control unit when said food is placed in said oven.

2. A cooking apparatus as claimed in claim 1, further comprising a card reader for reading said standard menu data and standard heating pattern data from a card and storing the read data into said memory.

3. A cooking apparatus as claimed in claim 1, further comprising a display unit for visually displaying said desired number of servings.

4. A cooking apparatus as claimed in claim 3, wherein said display unit is operated on a time sharing basis with said printer.

5. A cooking apparatus as claimed in claim 1, wherein said power control unit comprises means for repeatedly interrupting the operation of said microwave energy source according to said heating pattern data read out of said memory.

6. A cooking apparatus as claimed in claim 1, wherein said data processing unit further comprises means for consecutively reading said standard menu data of different menus out of said memory in response to command signals applied thereto and means for accumulating the quantities of each different material and causing said converting means to convert the accumulated quantities into corresponding print data for application to said printer.

* * * * *